US007088197B2

(12) United States Patent
Brosh et al.

(10) Patent No.: US 7,088,197 B2
(45) Date of Patent: Aug. 8, 2006

(54) ADAPTIVE POWER CONTROLLER DIGITAL INTERFACE

(75) Inventors: Richard Brosh, Manassas, VA (US); Scott Willis, Fairfax Station, VA (US); Kenneth Knowles, Manassas, VA (US); Matthew Gregory, Manassas, VA (US)

(73) Assignee: BAE SYSTEMS Information and Electronic Systems Integration Inc., Nashua, NH (US)

( * ) Notice: Subject to any disclaimer, the term of this patent is extended or adjusted under 35 U.S.C. 154(b) by 68 days.

(21) Appl. No.: 11/000,939

(22) Filed: Dec. 2, 2004

(65) Prior Publication Data
US 2006/0120118 A1    Jun. 8, 2006

(51) Int. Cl.
*H03L 1/00* (2006.01)
*H03L 7/06* (2006.01)
*G05F 1/10* (2006.01)

(52) U.S. Cl. .................. 331/186; 331/2; 327/540
(58) Field of Classification Search ............ 331/2, 331/17, 18, 74, 185–186; 327/530, 534–543
See application file for complete search history.

(56) References Cited

U.S. PATENT DOCUMENTS

| | | | |
|---|---|---|---|
| 6,366,522 B1 * | 4/2002 | May et al. ............... | 365/227 |
| 6,737,925 B1 * | 5/2004 | Logue et al. ............. | 331/2 |
| 6,801,028 B1 * | 10/2004 | Kernahan et al. ......... | 323/283 |
| 6,924,679 B1 * | 8/2005 | Seno et al. .............. | 327/158 |
| 2005/0062507 A1 * | 3/2005 | Naffziger et al. ......... | 327/105 |
| 2006/0064609 A1 * | 3/2006 | Bryan ................... | 714/700 |

OTHER PUBLICATIONS

Wei, Gu-Yeon et al., "A Fully Digital, Energy-Efficient, Adaptive Power-Supply Regulator," *IEEE Journal of Solid-State Circuits*, Apr. 1999, pp. 520-528, vol. 34, No. 4.
Alvarez, Jose et al., "A Wide-Bandwidth Low-Voltage PLL for PowerPC™ Microprocessors," *IEEE Journal of Solid-State Circuits*, Apr. 1995, pp. 383-391, vol. 30, No. 4.

* cited by examiner

*Primary Examiner*—David Mis
(74) *Attorney, Agent, or Firm*—Snider & Associates; Ronald R. Snider

(57) ABSTRACT

A digital adaptive power supply interface has two feedback loops, each including a VCO, to automatically compensate for temperature and semiconductor process variations. A first loop compares the system input phase/frequency to a reference voltage that has been converted to a first digital frequency signal by a VCO in the first loop, and generates an analog difference signal. The second loop compares this analog difference with the power supply output voltage, and a VCO in this second loop converts result of this comparison to a second digital frequency signal. The digital frequency signals of the two loops are fed respectively to two registers and the content of the registers are subtracted, one from the other, to generate a digital error signal adjust the power supply output voltage to the input frequency.

15 Claims, 2 Drawing Sheets

ADAPTIVE POWER CONTROLLER DIGITAL INTERFACE

BACKGROUND OF THE INVENTION

1. Field of the Invention

This invention relates to a digitally controlled adaptive power supply interface for adjusting a system supply voltage in response to changes in the system operating frequency, and more particularly to an improved digital adaptive power supply interface with self calibrated analog feedback and with control synchronized to the system operating frequency.

2. Description of the Prior Art

As will be appreciated by those skilled in the art, the power consumed by a synchronous digital system, such as a processor for example, is proportional to its operating frequency. Significant power and energy savings are possible if the supply voltage to the digital system is adjusted to match the system operating frequency.

A paper entitled A Fully Digital, Energy-Efficient, Adaptive Power-Supply Regulator by Wei and Horowitz published in the IEEE Journal of Solid-State Circuits, Vol. 34, No. 4, April 1999, incorporated herein by reference, describes a prior art digitally controlled adaptive power supply. FIG. 1 of this application is based on FIG. 8 of the paper and some of the basics of the prior teaching will be summarized here for convenience with reference to FIG. 1.

A reference signal $f_{ref}$ indicative of the digital circuit operating frequency and the output $f_{osc}$ of a voltage controlled oscillator VCO, indicative of the output voltage $V_o$, both feed counters and the number of transitions are counted for a fixed period of time. The difference between the outputs of the two counters corresponds to an error signal that is a function of the output voltage $V_o$ and the desired voltage for a digital system operating at the frequency $f_{ref}$. The binary equivalent of the error between the reference and oscillator frequencies feeds into a digital Proportional Integral Derivative (PID) controller, which uses the error value to make appropriate corrections to the output. The output of a pulse width modulated DC/DC converter is therefore adaptively regulated to the required voltage for the digital circuit operating frequency. A system clock $f_{loop}$ clocks the digital PID controller and sets the time base for the overall system. Over a period of $f_{loop}$ the counters count the reference and oscillator clock pulses to generate the equivalent numeric representations of the frequency, and it is over this same period that the variable duty cycle of the DC/DC converter is switched.

The VCO provides a simple analog to digital conversion, but the digital conversion value for a given voltage input varies with temperature and semiconductor process variations used in making the VCO. This is a source of error in the prior art systems. Further, the prior art adaptive power supplies are difficult to synchronize to the system they are supplying and do not provide a simple processor interface for accurate adjustment of the supply voltage by a processor.

SUMMARY OF THE INVENTION

An object of this invention is the provision of an adaptive digital power supply that is self-calibrating for temperature variations and variations in operation introduced by the process of manufacturing the semiconductor components.

Another object of the invention is the provision of an adaptive digital power supply that is synchronized to the system it supplies.

A further object of the invention is the provision of an adaptive digital power supply that provides a simple interface to a processor to digitally make accurate adjustments to the output voltage Briefly this invention contemplates the provision of a digital adaptive power supply which has two feedback loops, each including a VCO, to automatically compensate for temperature and semiconductor process variations. A first loop compares the system input phase/frequency to a reference voltage that has been converted to a first digital frequency signal by a VCO in the first loop, and generates an analog difference signal. The second loop compares this analog difference with the power supply output voltage, and a VCO in this second loop converts result of this comparison to a second digital frequency signal. The digital frequency signals of the two loops are fed respectively to two registers and the content of the registers are subtracted, one from the other, to generate a digital error signal adjust the power supply output voltage to the input frequency. Since the VCO in each loop is at the same temperature and is formed by the same semiconductor process any inaccuracy in the VCO operation is canceled.

DETAILED DESCRIPTION OF THE INVENTION

Figure 1:
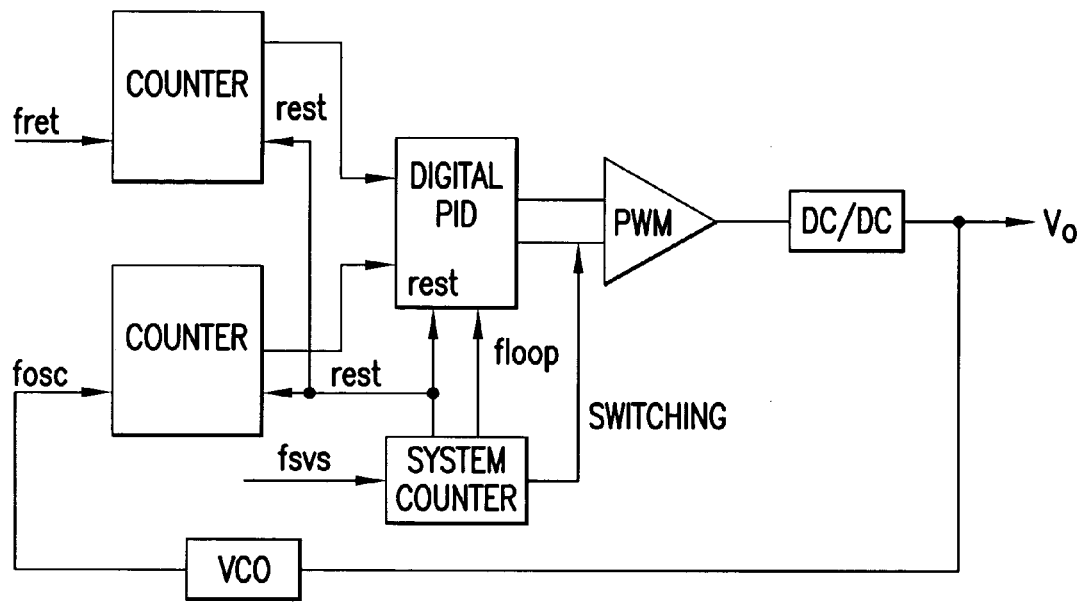
FIG. 1 is a block diagram of a prior art adaptive digital power supply.
Figure 3:
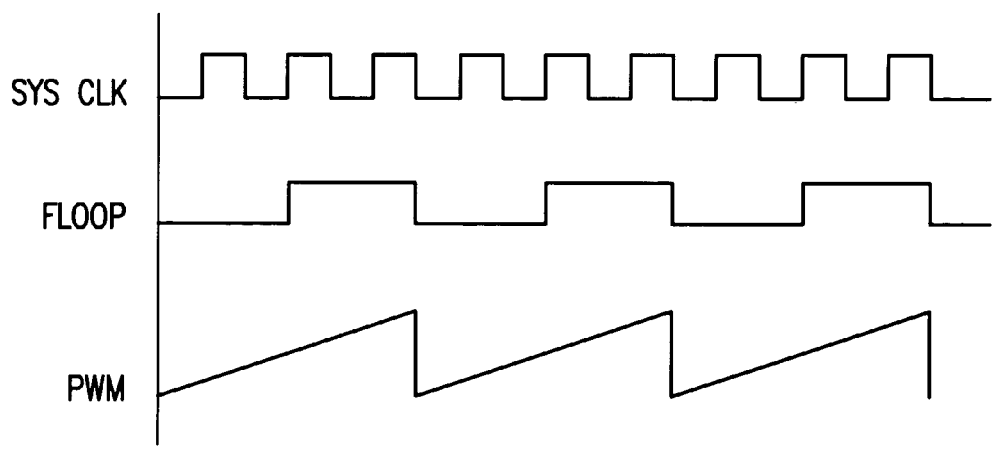
FIG. 3 is a timing diagram showing the relation of input signal to the power supply and the internal timing signal of the power supply.
Figure 2:
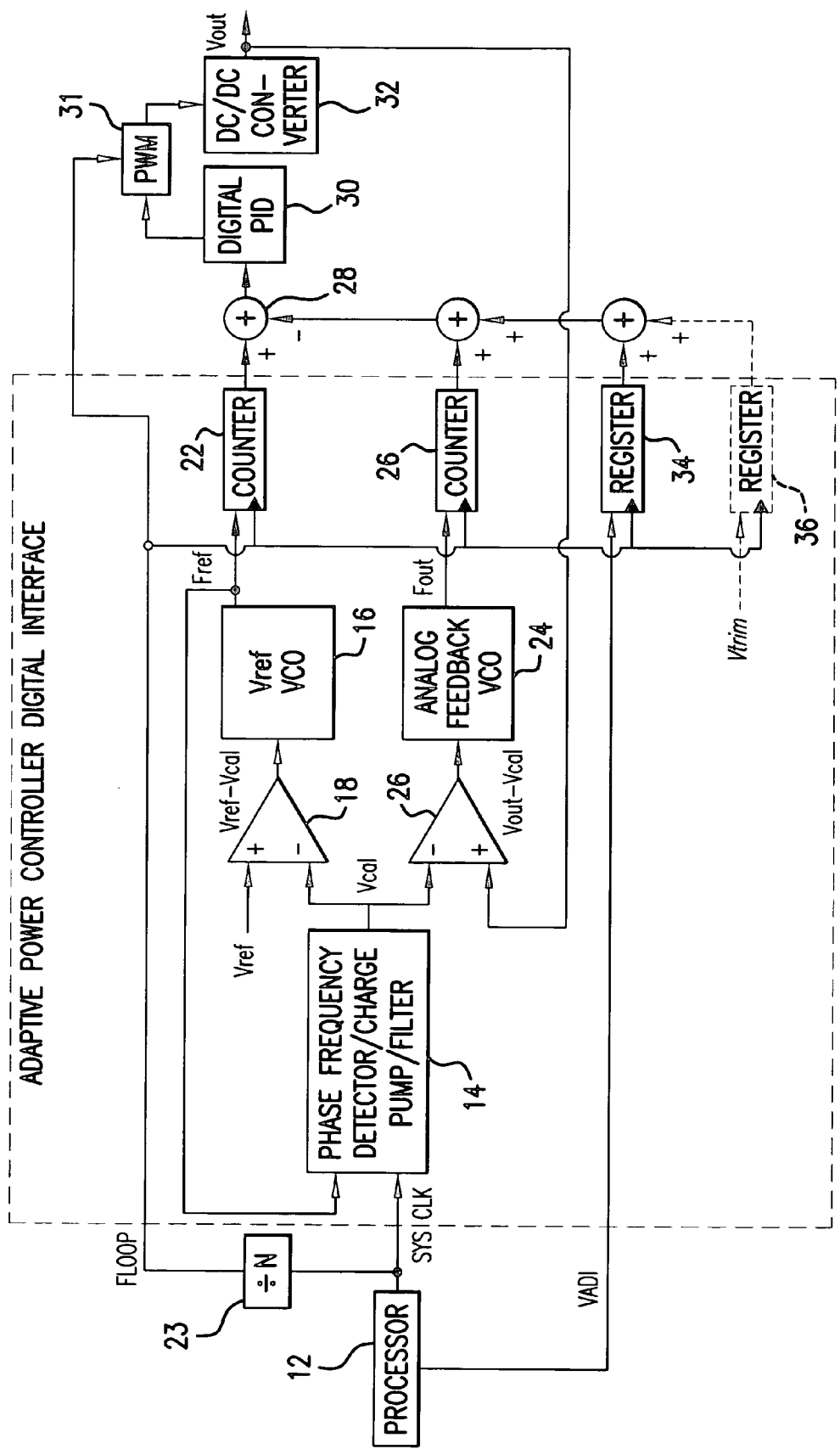
FIG. 2 is a block diagram of an adaptive digital power supply in accordance with the teachings of this invention.

Referring now to FIGS. 2 and 3, a synchronous digital system, such as processor 12, is powered by the output (Vout) of the power supply. In the firsts feedback loop, the synchronous system clock (SYS CLK) is coupled as one input to a suitable Phase/Frequency difference detector, Charge Pump, and Filter 14 of the type commonly used in a phase locked loop (PPL), such as the PPL described in a paper entitled A Wide-Bandwidth Low-Voltage PLL for Power PC Microprocessors, by Alvares et al, published in the IEEE Journal of Solid-State Circuits, Vol. 30, No 4, April 1995, and incorporated herein by reference. The other input to the detector 14 is a reference frequency ($F_{ref}$) output signal of a VCO 16 whose input (Vref–Vcal) from a comparator 18 is equal to the difference between an analog reference voltage Vref and the analog output (Vcal) of the detector 14. The binary output pulse signal $F_{ref}$ of VCO 16 is coupled to the input of a binary counter 22. A read out signal $F_{loop}$ periodically reads out the contents of counter 22. A frequency divider 23 divides the SYS CLK to generate the $F_{loop}$ signal so that the $F_{loop}$ system is synchronized to the SYS CLK, as illustrated in FIG. 3.

The second feedback loop includes Analog Feedback VCO 24, comparator 26, and the output voltage Vout, which provides one input to the comparator 26. The analog output Vcal of the detector 14 provides the other input to comparator 26, the analog output (Vout–Vcal) of which provides the input to VCO 24. The variable frequency output pulse signal $F_{out}$ of VCO 24 is coupled to a counter 26, whose count is periodically read out in response to the divided down system clock signal, $F_{loop}$ at the same time counter 22 is read out. The outputs of counters 22 and 26 are coupled to a summing junction 28, where the arithmetic difference between the two counts provides the input to Digital Proportional, Integral, Derivative (PID) error signal generator 30. The PID 30 provides an error signal to a pulse width modulation 31, which provides a pulse width modulated output signal synchronized with the divided down system clock Flop, to a DC/DC Converter 32, such as a buck converter for example, which controls the output voltage Vout.

Register 34 provides a means by which an externally generated digital word from processor 12 can adjust the output voltage Vout. The processor 12 provides the system clock SYS CLK and the loop clock $F_{loop}$ clock that respectively load and read counters 22 and 26. The processor can adjust the output voltage by providing a digital word Vadj in register 34, which when read out will be summed with the output of counters 22 and 26 and thereby offset the output voltage Vout by a known amount. Similarly, a register 36 may be provided to trim the initial output voltage by using a nonvolatile memory to store in register 36 a digital word, Vtrm.

The invention claimed is:

1. An adaptive power control interface for providing a variable voltage output to a digital system operating with a system clock frequency signal, comprising in combination:
   a first feedback loop including an analog reference voltage and means including a first voltage controlled oscillator for comparing said system clock frequency signal to said analog voltage reference to generate a first binary output signal from said first voltage controlled oscillator,
   a second feedback loop including a second voltage controlled oscillator for comparing said system clock frequency signal to said variable voltage output to generate a second binary output signal from said second voltage controlled oscillator;
   a first counter coupled to the first binary output signal of said first voltage controlled oscillator and a second counter coupled to the second binary output signal of said second voltage controlled oscillator;
   algebraic summing means to periodically sum a count in said first counter and a count in said second counter to generate a digital control word that represents the difference of the two sums; and
   control means responsive to said control word for controlling said variable output voltage.

2. An adaptive power control interface as in claim 1, wherein said control means is synchronized with said system clock frequency signal.

3. An adaptive power control interface as in claim 1, further including a register for storing a digital word from said digital system and means to add said digital word to said digital control word to provide an offset in said variable output voltage.

4. An adaptive power control interface as in claim 2, further including a frequency divider with its input coupled to said system clock frequency signal and its output coupled to said control means.

5. An adaptive power control interface as in claim 4, including trim register for storing a digital trimming word and mans to add said digital trimming word to said digital control word.

6. An adaptive power control interface as in claim 2, further including a register for storing a digital word from said digital system and means to add said digital word to said digital control word to provide an offset in said variable output voltage.

7. An adaptive power control interface for providing a variable voltage to a digital system operating with a system clock frequency signal, comprising in combination:
   a first feedback loop including an analogue reference voltage and means including a voltage controlled oscillator and a phase/frequency detector for comparing said system clock frequency signal to said analog voltage reference to generate a first binary output signal from said first voltage controlled oscillator,
   a second feedback loop including a second voltage controlled oscillator for comparing said system clock frequency signal to said variable voltage output to generate a second binary output signal from said second voltage controlled oscillator
   a first counter coupled to the first binary output signal of said first voltage controlled oscillator and a second counter coupled to the second binary output signal of said second voltage controlled oscillator;
   algebraic summing means to periodically sum a count in said first counter and a count in said second counter to generate a digital control word; and
   control means responsive to said control word for controlling said variable output voltage.

8. An adaptive power control interface as in claim 7, wherein said control means is synchronized with said system clock frequency signal.

9. An adaptive power control interface as in claim 7, further including a register for storing a digital word from said digital system and means to add said digital word to said digital control word to provide an offset in said variable output voltage.

10. An adaptive power control interface as in claim 8, further including a frequency divider with its input coupled to said system clock frequency signal and its output coupled to said control means.

11. An adaptive power control interface as in claim 7, including trim register for storing a digital trimming word and mans to add said digital trimming word to said digital control word.

12. A method for adaptively controlling a variable voltage output to a digital system operating with a system clock frequency including the steps of:
   comparing said system clock frequency signal to an analogue reference voltage to generate a first binary output signal;
   comparing said system clock frequency signal to said variable voltage output signal to generate a second binary output signal;
   counting said first binary output signal;
   counting said second binary output signal;
   periodically summing the results of said counting steps to generate a digital control word to control said variable output voltage.

13. A method as in claim 12, including a further step of adding a digital word to said digital control word.

14. A method as in claim 12, including a further step of adding a digital trim word to said digital control word.

15. A method as in claim 13, including a further step of adding a digital trim word to said digital control word.

* * * * *